United States Patent
Jeol et al.

(10) Patent No.: US 10,745,520 B2
(45) Date of Patent: Aug. 18, 2020

(54) PROCESS FOR PRODUCING AROMATIC POLYIMIDES

(71) Applicants: RHODIA OPERATIONS, Paris (FR); INSTITUT NATIONAL DES SCIENCES APPLIQUES DE LYON, Villeurbanne (FR); CENTRE NATIONAL DE LA RECHERCHE SCIENTIFIQUE, Paris (FR); UNIVERSITE CLAUDE BERNARD LYON 1, Villeurbanne (FR); UNIVERSITE JEAN MONNET SAINT-ETIENNE, Saint Etienne (FR)

(72) Inventors: Stéphane Jeol, Cumming, GA (US); René Rossin, Francheville (FR); Vincent Mollet, Irginy (FR); Benjamin Paci, Woippy (FR); Françoise Fenouillot-Rimlinger, L'Isle D'Abeau (FR); Alain Rousseau, Bron (FR)

(73) Assignees: CENTRE NATIONAL DE LA RECHERCHE SCIENTIFIQUE, Paris (FR); UNIVERSITE CLAUDE BERNARD LYON1, Villeurbanne (FR); UNIVERSITE JEAN MONNET SAINT-ETIENNE, Saint Etienne (FR); Rhodia Operations, Paris (FR); Institut National Des Sciences Appliquees De Lyon, Villeurbanne (FR)

( * ) Notice: Subject to any disclaimer, the term of this patent is extended or adjusted under 35 U.S.C. 154(b) by 0 days.

(21) Appl. No.: 15/535,884

(22) PCT Filed: Dec. 17, 2015

(86) PCT No.: PCT/EP2015/080377
§ 371 (c)(1),
(2) Date: Jul. 10, 2017

(87) PCT Pub. No.: WO2016/097232
PCT Pub. Date: Jun. 23, 2016

(65) Prior Publication Data
US 2018/0355109 A1    Dec. 13, 2018

(30) Foreign Application Priority Data

Dec. 18, 2014  (EP) .................................... 14307086

(51) Int. Cl.
C08G 73/10    (2006.01)

(52) U.S. Cl.
CPC ....... *C08G 73/1082* (2013.01); *C08G 73/105* (2013.01); *C08G 73/1028* (2013.01); *C08G 73/1067* (2013.01)

(58) Field of Classification Search
CPC ...... C08G 73/1082; C08G 73/10; C08L 79/08
See application file for complete search history.

(56) References Cited

U.S. PATENT DOCUMENTS

| | | | |
|---|---|---|---|
| 2,710,853 A | 6/1955 | Edwards | |
| 2,867,609 A | 1/1959 | Edwards | |
| 3,833,546 A | 9/1974 | Takekoshi | |
| 7,932,012 B2 | 4/2011 | Komatsu et al. | |
| 2014/0228513 A1* | 8/2014 | Jeol ................... | C08G 73/1007 524/600 |
| 2014/0342628 A1* | 11/2014 | Jeol ................... | C08G 73/1007 442/181 |
| 2015/0045501 A1 | 2/2015 | Jeol | |

FOREIGN PATENT DOCUMENTS

| | | | |
|---|---|---|---|
| CN | 103890042 A | | 6/2014 |
| JP | 20121-092262 | * | 5/2012 |
| JP | 2012092262 A | | 5/2012 |
| WO | 2013041532 A1 | | 3/2013 |

OTHER PUBLICATIONS

First Office Action dated Aug. 2, 2019, by The State Intellectual Property Office of People's Republic of China (SIPO) in corresponding Chinese Patent Application No. CN-201580076585.8, with USPTO Global Dossier English translation (13 pages).

Koning, Cor, et al., "Influence of polymerization conditions on melt crystallization of partially aliphatic polyimides"; Polymer, vol. 39, No. 16; 1998; pp. 3697-3702 (6 pages).

Inoue, Tatsuo, et al., "High-Pressure Synthesis and Properties of Aliphatic-Aromatic Polyimides via Nylon-Salt-Type Monomers Derived from Aliphatic Diamines with Pyromellitic Acid and Biphenyltetracarboxylic Acid"; Macromolecules, vol. 30, No. 7; 1997; pp. 1921-1928 (8 pages).

* cited by examiner

*Primary Examiner* — Gregory Listvoyb
(74) *Attorney, Agent, or Firm* — Thi Dang

(57) ABSTRACT

The invention relates to a process for producing aromatic polyimides, comprising the following steps: (a) preparation of one or more solid salt(s) by reacting one or more aromatic tetracarboxylic acid(s) and one or more diamine(s) according to a mole ratio ranging from 0.95 to 1.05; (b) drying of the solid salt(s), (c) addition, to the dry salt resulting from step (b), of one or more compound(s) (C) comprising one or more group(s) chosen from a carboxylic acid group, an anhydride group, an ester group and an acyl chloride group; (d) solid-state polymerization of said solid salt(s) in the presence of the compound(s) (C).

15 Claims, No Drawings

PROCESS FOR PRODUCING AROMATIC POLYIMIDES

CROSS-REFERENCE TO RELATED APPLICATIONS

The present application is a U.S. national phase entry under 35 U.S.C. § 371 of International Application No. PCT/EP2015/080377, filed on 17 Dec. 2015, which claims priority to European Application No. 14307086.0, filed on 18 Dec. 2014. The entire content of each of these applications is explicitly incorporated herein by reference.

The present invention relates to aromatic thermoplastic polyimides and to the preparation thereof.

More precisely, the invention relates to a process for manufacturing thermoplastic polyimides by solid-state polymerization of one or more dry solid ammonium carboxylate salts formed from one or more diamines and one or more aromatic tetracarboxylic acids.

Polyimides, and especially aromatic polyimides, are known for their exceptional thermal and/or mechanical properties, which mark them out in particular for "high-performance" applications in various fields such as aeronautics or else electronics (printed circuit boards for example).

Nevertheless, these aromatic polyimides are considered to be thermosetting and infusible and require the use of synthesis processes in solution in solvents which are toxic, especially carcinogenic or potentially carcinogenic in some cases, and/or environmentally unfriendly, starting from aromatic diamines and aromatic dianhydrides. The best-known and most widespread process for synthesizing polyimides is a two-step process which involves a first step of reacting an aromatic dianhydride, in a solvent such as dimethylacetamide, cresols or else N-methylpyrrolidone, with an aromatic diamine, to form an intermediate known as a polyamic acid, which is subsequently converted to polyimide in a second step, by increasing the temperature or by chemical dehydration.

During the first step, the amines open the anhydride rings and give rise to an acid amide function, often called an amic acid function. The polyamic acid formed is soluble in the synthesis solvent and is converted by cyclization into polyimide, which is usually insoluble. To make a polyimide film, for example, a solution of poly(amic acid) is poured onto a heating surface. When the heating surface is heated, the solvent evaporates and cyclization takes place: a polyimide film is then obtained.

In order to render the aromatic polyimides fusible, and therefore amenable to conversion by techniques of extrusion or injection molding, in particular, it is known practice to use more flexible aromatic diamines, which give rise to amorphous polyimides with a glass transition temperature Tg of close to 200° C., which are known by the polyetherimide name, with Ultem being one commercial name. Processes have been developed which involve performing melt polymerization at between 275 and 290° C., as in patent U.S. Pat. No. 3,833,546, from a direct mixture of aromatic dianhydride and aromatic diamine or of aromatic tetracarboxylic acid and aromatic diamine. In this case, the control of the stoichiometry of the reagents is not optimal, and rapid degradation reactions take place. One drawback is that when the service temperature is greater than the glass transition temperature Tg of the polyimide, the polyimide loses its mechanical strength, owing to its amorphous nature. Lastly, as an amorphous polymer, the mechanical properties are dependent primarily on the molar mass, which must be greater than the molar mass between entanglements: for these polymers, this implies having appreciable molar masses, and this is accompanied by a high melt viscosity. These flexible aromatic polyimides are, in spite of this, considered to be thermoplastics.

Semiaromatic polyimides also represent an interesting approach, since they can be semicrystalline and can have melting points that are compatible with the conversion temperatures of thermoplastics, a melting point generally below 330° C., and can therefore be converted by the processing processes that are known for thermoplastics, similar to polyamides, while enjoying excellent heat resistance.

A variety of synthetic methods exist, starting with solution synthesis as described for aromatic polyimides. One example of polyimide solution synthesis is described by Cor Koning in the journal Polymer 1998, volume 39, 16, pages 3697-3702. The authors synthesize polyimides in solution from 3,3'-4,4'-biphenyltetracarboxylic dianhydride and from aliphatic diamines containing between 4 and 10 methylene groups. The polyimides obtained possess melting points below 330° C. Melt polymerizations are described in patent U.S. Pat. No. 2,710,853 or 2,867,609, from aliphatic diamine and pyromellitic anhydride, or from pyromellitic diacid anhydride diester derivatives, in accordance with known processes for polyamide synthesis. The major drawback of this technique is that it requires the selection of a synthesis temperature which is above the melting point of the polyimide formed, over long durations, thereby giving rise to substantial and significant thermal degradation.

To overcome this problem, a Japanese team (Inoue et al. in Macromolecules 1997, 30, 1921-1928 "High Pressure Synthesis of Aliphatic-Aromatic Polyimides via Nylon-Salt-Type Monomers derived from aliphatic diamines and pyromellitic acid and biphenyltetracarboxylic acid") identified a method for polymerizing an aromatic tetracarboxylic acid salt and aliphatic diamines in the solid state. The authors thus prepare a salt which is pressed at pressures of several hundred bar, to give objects such as disks, and subsequently heat the resulting disks to a given temperature under various pressures. In the course of the heating, the reaction takes place, and generates water, which shows that the reaction has taken place, and would take place very rapidly.

The problem with the processes envisaged by these authors lies in the fact that it is necessary to extract the water of reaction formed in the course of the forming operation, and this may give rise to defects in the moldings, with long conversion times giving rise to excessive conversion costs and/or possibly producing moldings of suboptimum quality, with problems of porosity and surface appearance, or else requiring adaptation and/or changing of equipment intended for the use of nonreactive polymers.

In addition, the existing processes may prove unsatisfactory in terms of controlling the molar mass and/or the viscosity of the polyimide. However, controlling these parameters is particularly important, in particular depending on the applications for which these polymers are intended.

Furthermore, applications exist for which the polymers are required to be in the form of powders. This is especially the case for laser sintering or processes for manufacture of continuous fiber composites from powders by dusting of fabrics or pultrusion of carbon or glass monofilament, or else other processes. The known technologies for producing polymer powders require either dissolving a polymer in a solvent and then precipitating it from a non-solvent—but this involves the use of toxic and carcinogenic solvents—or mixing the polymer melt with an immiscible species, so as to generate segregation of the desired polymer, or else milling granules of formulated polymers, which imposes additional steps of micronization and drying. Whatever the case cited, the processes are complex and expensive.

Furthermore, the polyimides obtained by the prior-art processes, especially via the solid and/or diester route, may have an unsatisfactory relative viscosity and/or an unsatisfactory molar mass, and/or may have an excessive variation in their relative viscosity and/or in their molar mass before and after melting thereof.

In order to address these various problems, an improved process for obtaining semiaromatic and semicrystalline polyimide solid particles was described in patent application WO 2013/041 528. It is first a matter of reacting at least one diamine with at least one aromatic tetracarboxylic acid so as to obtain a salt. This first step may be performed in the presence of a chain limiter and/or of an excess of one of the monomers. A solid-state polymerization of the salt is then performed at a temperature above the glass transition temperature Tg of the polyimide to be obtained while at the same time remaining below the melting point of the salt obtained during the first step. The molar mass of the solid polyimide particles obtained is especially controlled by the amount of chain limiter and/or of excess of one of the monomers introduced during the first step.

The Applicant realized that this synthetic method was not entirely satisfactory and that it was possible to prepare aromatic and semicrystalline polyimide solid particles even more efficiently. Specifically, finer control of the molar mass and of the viscosity of the polyimides may be obtained via a particularly improved process.

Controlling the molar mass and the viscosity of the polyimides obtained is of great importance. The reason for this is that it is necessary to have control thereof that is as precise as possible.

One object of the present invention is to propose a solution for solving all of the problems mentioned above.

The process for manufacturing aromatic polyimides according to the invention comprises the following steps:
 (a) preparing one or more solid salts by reacting one or more aromatic tetracarboxylic acids and one or more diamines in a mole ratio ranging from 0.95 to 1.05;
 (b) drying the solid salt(s);
 (c) adding to the dry salt derived from step (b) one or more compounds (C) comprising one or more groups chosen from a carboxylic acid group, an anhydride group, an ester group and an acyl chloride group;
 (d) solid-state polymerization of said solid salt(s) in the presence of the compound(s) (C).

In the process according to the invention, it is only once the dry solid salt has been obtained that a particular compound (C) as defined above is added.

The process according to the invention allows the industrial, efficient and robust preparation of aromatic polyimides for various applications. The polyimides obtained are semicrystalline thermoplastics with the property of not releasing or absorbing water during subsequent conversion steps, for instance pultrusion, extrusion, or injection molding. They may especially be obtained in the form of powder with controlled particle sizes.

The process according to the invention allows particularly efficient control of the molar mass and of the viscosity of the polyimides obtained.

These powders may especially be used for producing composite articles, for producing articles by laser sintering, for coating, or in the cosmetic sector.

In addition, solid-state polymerization avoids the use of carcinogenic or environmentally unfriendly solvents.

Another advantage of the process of the invention is the capacity to perform polymerization at a relatively low temperature, avoiding thermal degradation of the salt and of the polyimide formed.

Other advantages and characteristics of the invention will emerge more clearly on examining the detailed description below.

The polyimide obtained via the process according to the invention is thermoplastic and semicrystalline. Preferably, it has a melting point Tf ranging from 50 to 350° C.

The melting point of the polyimide is preferably determined at the peak of the fusion endotherm as measured by differential scanning calorimetry (DSC), using a Perkin Elmer Pyris 1 machine, by heating the polyimide starting from 20° C. at a rate of 10° C./min.

The term "semicrystalline polyimide" refers to a polyimide having an amorphous phase and a crystalline phase, for example having a degree of crystallinity of between 1% and 85%.

The polyimides obtained via the process according to the present invention preferentially have a glass transition temperature Tg of less than or equal to 200° C., more preferentially less than or equal to 150° C.

The term "thermoplastic polyimide" means a polyimide having a temperature above which the material softens and melts, and below which it becomes hard.

The polyimide obtained via the process according to the invention may have a substantially stable number-average molar mass, in particular compared before and after melting of the polyimide, in particular after 10 minutes in the melt state, more particularly after 20 minutes in the melt state, or even after 40 minutes in the melt state. The term "substantially stable" refers to a change of less than or equal to 10%.

Said polyimide may have a stable relative viscosity. In particular, it may have, after 40 minutes at a temperature equal to Tf+15° C., this being a temperature 15° C. above the melting point of the polyimide, a change in its relative viscosity of less than or equal to 10%. This may be measured in the manner described in the examples.

The present invention relates to the manufacture of aromatic polyimides from one or more aromatic tetracarboxylic acids and one or more diamines. The polymers obtained from only one diamine and only one tetracarboxylic acid are polyimides, which are generally known as homopolyimides. The reaction between at least three different monomers produces a polyimide, generally known as a copolyimide, most particularly two diamines and one tetracarboxylic acid or one diamine and two tetracarboxylic acids. The polyimides may be defined by the molar composition of each constituent monomer.

Step (a) according to the invention consists in preparing one or more solid salts by reacting one or more aromatic tetracarboxylic acids and one or more diamines in a mole ratio ranging from 0.95 to 1.05.

The salt thus prepared is a salt in which the diamine and tetracarboxylic acid species are linked solely via polar interactions, in particular of the type —COO$^-$H$_3$$^+$N—, and not via covalent bonds. More particularly, the salt comprises an aromatic tetracarboxylic acid and a diamine, which are not covalently bonded together. In particular, the salt may have the following structure, with Ar representing an aromatic group:

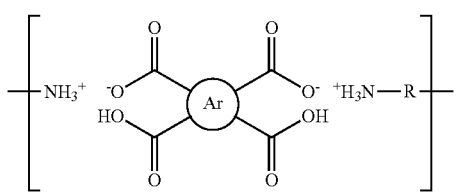

The aromatic tetracarboxylic acids used in step (a) of the process according to the invention preferentially contain carboxylic acid functions in positions such that they generally make it possible to form two acid anhydride functions on the same molecule via a dehydration reaction. The aromatic tetracarboxylic acids of the present invention generally contain two pairs of carboxylic acid functions, each pair of functions being linked to an adjacent carbon atom, at α and β. The tetracarboxylic acid functions may be obtained from acid dianhydrides by hydrolysis of the anhydride functions. Examples of aromatic acid dianhydrides and of aromatic tetracarboxylic acids, derived from dianhydrides, are described in patent U.S. Pat. No. 7,932,012.

The aromatic tetracarboxylic acids of the invention may also bear functional groups, especially the group —SO$_3$X, where X=H or a cation, such as Na, Li, Zn, Ag, Ca, Al, K, and Mg.

Advantageously, the aromatic tetracarboxylic acids are chosen from pyromellitic acid, 3,3',4,4'-biphenyltetracarboxylic acid, 2,3,3',4'-biphenyltetracarboxylic acid, 2,2',3,3'-biphenyltetracarboxylic acid, 3,3',4,4'-benzophenonetetracarboxylic acid, 2,2',3,3'-benzophenonetetracarboxylic acid, 1,2,5,6-naphthalenetetracarboxylic acid, 2,3,6,7-naphthalenetetracarboxylic acid, 2,3,5,6-pyridinetetracarboxylic acid, 3,4,9,10-perylenetetracarboxylic acid, 3,3',4,4'-tetraphenylsilanetetracarboxylic acid, and 2,2'-bis(3,4-bicarboxyphenyl) hexafluoropropanetetracarboxylic acid.

Preferably, the diamines of the invention are molecules of formula H$_2$N—R—NH$_2$ with a saturated or unsaturated, linear or branched aliphatic, cycloaliphatic or aromatic, divalent hydrocarbon-based radical R, optionally comprising one or more heteroatoms.

The radical R advantageously comprises from 2 to 50 carbon atoms, preferentially from 6 to 36 carbon atoms. The radical R may optionally contain one or more heteroatoms, such as O, N, P, or S. The radical R may comprise one or more functional groups, such as hydroxyl, sulfone, ketone, ether, or other functions.

Preferably, the amine functions are primary amines.

According to a first embodiment, the diamines of the invention are chosen from aliphatic diamines.

The diamines may especially be diamines in positions at and w, containing from 15 to 20 methylene groups.

Preferably, the aliphatic diamines are chosen from 1,2-diaminoethane, 1,3-diaminopropane, 1,4-diaminobutane, 1,5-diaminopentane, 2-methyl-1,5-diaminopentane, hexamethylenediamine, 3-methylhexamethylenediamine, 2,5-dimethylhexamethylenediamine, 2,2,4- and 2,4,4-trimethylhexamethylenediamine, 1,7-diaminoheptane, 1,8-diaminooctane, 2,2,7,7-tetramethyloctamethylenediamine, 1,9-diaminononane, 5-methyl-1,9-diaminononane, 1,10-diaminodecane, 1,11-diaminoundecane, 1,12-diaminododecane, 1,13-diaminotridecane, and 1,14-diaminotetradecane.

According to a particular embodiment of the invention, the diamines are chosen from cycloaliphatic diamines, and preferably from isophorone diamine, 1,3-diaminocyclohexane, 1,4-diaminocyclohexane, diaminodicyclohexylmethane, 1,3-bis(aminomethyl)cyclohexane, 4,4'-methylenebis(cyclohexylamine) and 4,4'-methylenebis(2-methylcyclohexylamine).

Mention may also be made of examples of diamines containing heteroatoms, such as polyether diamines, for instance the Jeffamine® and Elastamine® products sold by Huntsman. A variety of polyethers exist, composed of ethylene oxide, propylene oxide or tetramethylene oxide units.

According to a second embodiment, the diamines of the invention are chosen from aromatic diamines.

Preferably, the aromatic diamines are aromatic diamines comprising from 6 to 24 carbon atoms, more preferentially from 6 to 18 carbon atoms and even more preferentially from 6 to 10 carbon atoms, for instance m-xylylenediamine (MXDA).

Preferably, the aromaticity of the aromatic diamines results from the presence of the m-phenylene and/or o-phenylene groups, in a total number of said groups ranging from 1 to 2.

Advantageously, the aromatic diamines are chosen from m-phenylenediamine (MPD), p-phenylenediamine (PPD), 3,4'-diaminodiphenyl ether (3,4'-ODA), 4,4'-diaminodiphenyl ether (4,4'-ODA), m-xylylenediamine (MXDA), as illustrated below:

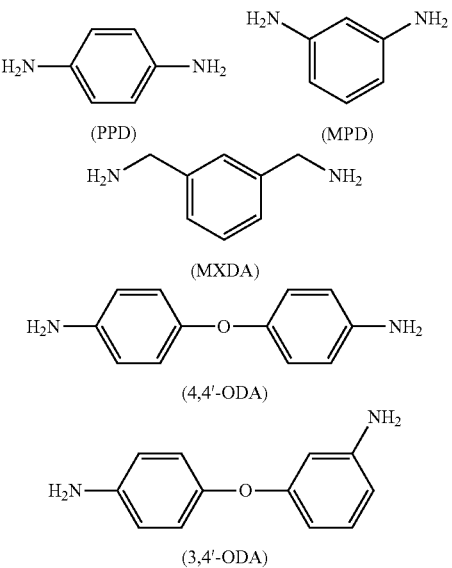

and p-xylylenediamine (PXDA, not shown).

An aromatic diamine that is particularly preferred is m-xylylenediamine (MXDA).

During step (a) of the process, one or more solid salts are prepared by reacting one or more aromatic tetracarboxylic acids and one or more diamines in a mole ratio ranging from 0.95 to 1.05. This means that the ratio between the amount in moles of aromatic tetracarboxylic acid(s), on the one hand, and the amount in moles of diamine(s), on the other hand, ranges from 0.95 to 1.05.

Advantageously, the solid salt(s) are prepared by reacting one or more aromatic tetracarboxylic acids and one or more diamines in a mole ratio ranging from 0.99 to 1.01.

According to a particular embodiment, the solid salt(s) are prepared by reacting in stoichiometric amount one or more aromatic tetracarboxylic acids and one or more diamines.

The term "stoichiometric amount" means, in a manner that is known per se, that the aromatic tetracarboxylic acid(s) and the diamine(s) are added in a strict mole ratio of 1.

Such a salt may be synthesized in various ways known to those skilled in the art.

One possible procedure, for example, is to add a diamine to a solution comprising the aromatic tetracarboxylic acid. Another possibility is to dissolve the aromatic tetracarboxylic acid in a solvent such as alcohol, for instance ethanol or methanol, and to do likewise for the diamine. These two solutions are then mixed together with stirring. The salt formed may be insoluble in the solvent used and thus precipitate out.

It is also possible to make a solution of the salt formed from a diamine and an aromatic tetracarboxylic acid and then to concentrate it while hot and then cool it. The salt then crystallizes and the crystals are recovered and dried. The solution may be concentrated by evaporating off the solvent, such as the water or alcohol, or by another process, by addition of aromatic tetracarboxylic acid and/or diamine. It is also possible to perform saturation of the solution, i.e. to perform a process for modifying the concentration of the salt in the solution to a value that is compatible with its crystallization. Generally, this concentration is at least equal to and more preferentially greater than the saturation concentration of the salt at the temperature under consideration. More precisely, this concentration corresponds to supersaturation of the salt solution. It is also possible to work at a pressure that enables the solvent of the solution, such as the water or alcohol, to evaporate off, so as to saturate the solution and bring about crystallization. A further possibility is to saturate the solution by successive or simultaneous addition of a stream of aromatic tetracarboxylic acid and a stream of diamine to a salt solution.

By way of example, the aromatic tetracarboxylic acid is dissolved in the alcohol, such as ethanol, for example, in a first medium. The diamine is dissolved in alcohol in another medium, and the two media are then mixed with stirring. The salt obtained precipitates out.

At the end of this synthesis, the salt derived from step (a) is recovered and dried so that a dry powder is obtained.

The salt may be recovered by filtration in the case of a precipitate, and the filter cake may be disintegrated, if necessary.

When the salt is dissolved in solution, it may be recovered via a crystallization process by concentration or supersaturation or by making it precipitate out by addition of a non-solvent. The crystallized salt may then be recovered by filtration and the filter cake may be disintegrated, if necessary.

Drying of the salt is preferably performed under vacuum or by flushing with an inert gas such as nitrogen at a temperature ranging up to 150° C.

Another process for recovering the dispersed particles of dry salt is spraying of the solution, i.e. in particular an operation of sudden evaporation of the solvent sprayed in the form of fine droplets so as to recover the dispersed salt particles.

Finally, it is possible to screen the salt particle size, for example by sifting or milling.

During step (c), one or more compounds (C) comprising one or more groups chosen from a carboxylic acid group, an anhydride group, an ester group and an acyl chloride group are added to the dry salt derived from step (b).

The compound(s) (C) added in step (c) make it possible to control the chain lengths of the polyimide and thus act as chain limiter.

According to one embodiment of the invention, the compound(s) (C) are chosen from monoanhydrides, monoacids, diacids, aromatic tetracarboxylic acids and aromatic dianhydrides.

The monoacids especially include acid monoesters as obtained by reacting an alcohol and an anhydride. The diacids especially include aromatic diacid diesters as obtained by reacting an alcohol and an aromatic dianhydride.

When compound (C) contains one or more aromatic tetracarboxylic acids, they may be identical to or different from those used in step (a) of the process according to the invention.

Preferably, the compound(s) (C) are chosen from phthalic anhydride, pyromellitic anhydride, trimellitic anhydride, 1,2-benzenedicarboxylic acid (or ortho-phthalic acid), acetic acid, propionic acid, benzoic acid, stearic acid, mellitic acid, trimellitic acid, phthalic acid, pyromellitic acid, hexan-1-oic acid, 1,2,3,4,5-benzenepentacarboxylic acid, 3,3',4,4'-biphenyltetracarboxylic acid, 2,3,3',4'-biphenyltetracarboxylic acid, 2,2',3,3'-biphenyltetracarboxylic acid, 3,3',4,4'-benzophenonetetracarboxylic acid, 2,2',3,3'-benzophenonetetracarboxylic acid, 1,2,5,6-naphthalenetetracarboxylic acid, 2,3,6,7-naphthalenetetracarboxylic acid, 2,3,5,6-pyridinetetracarboxylic acid, 3,4,9,10-perylenetetracarboxylic acid, 3,3',4,4'-tetraphenylsilanetetracarboxylic acid, 2,2'-bis(3,4-bicarboxyphenyl)hexafluoropropanetetracarboxylic acid, trimellitic anhydride chloride and acid, ester and diester derivatives thereof, benzoyl chloride, toluoyl chloride, naphthoyl chloride, tetramethyl pyromellitate, tetraethyl pyromellitate, trimethyl 1,2,4-pyromellitate, trimethyl 1,2,5-pyromellitate, diethyl 1,2-pyromellitate, diethyl 1,4-pyromellitate, diethyl 1,5-pyromellitate, dimethyl 1,2-pyromellitate, dimethyl 1,4-pyromellitate, dimethyl 1,5-pyromellitate, methyl pyromellitate, ethyl pyromellitate, trimethyl trimellitate, triethyl trimellitate, dimethyl 1,3-trimellitate, dimethyl 1,4-trimellitate, diethyl 1,3-trimellitate, diethyl 1,4-trimellitate, diethyl 3,4-trimellitate, methyl trimellitate, ethyl trimellitate, isophthalic acid, terephthalic acid, succinic acid, glutaric acid, adipic acid, sebacic acid and 1,12-dodecanedioic acid, and mixtures thereof.

Particularly preferably, the compound(s) (C) are chosen from pyromellitic acid and phthalic acid, and mixtures thereof.

The amount of compound (C) introduced into step (c) is advantageously greater than 0.5% as number of moles relative to the total number of moles of reagents, i.e. relative to the total number of moles of aromatic tetracarboxylic acid and of diamine used in step (a) of the process according to the invention. Preferably, the amount of compound (C) introduced into step (c) ranges from 0.5 to 10% as number of moles, more preferentially from 1 to 5% as number of moles, relative to the total number of moles of reagents.

In addition, use may be made of catalysts, added at any point during the process, for instance as a mixture with the diamine and/or the aromatic tetracarboxylic acid, as a mixture with the salt formed, either in solution or by impregnation of the salt in the solid state.

During step (d) of the process according to the invention, solid-state polymerization of the dry solid salt(s) derived from step (b) is performed in the presence of the compound(s) (C) to obtain the polyimide.

For the purposes of the present invention, the term "solid-state polymerization" refers to a polymerization which is not performed in solution or in suspension in a solvent, nor in the melt state.

According to a preferred embodiment of the invention, the polymerization is performed at a temperature T that obeys the following relationship: Tf of the salt from step (a)>T>Tg of the polyimide to be obtained.

The Tf of the salt derived from step (a) denotes the melting point of said salt.

The melting point of the salt is preferentially determined by measuring the endotherm endpoint temperature as measured by differential scanning calorimetry (DSC), using a Perkin Elmer Pyris 1 machine, by heating the salt starting from 20° C. at a rate of 10° C./min.

Advantageously, the polymerization is performed at an absolute pressure ranging from 0.005 to 1 MPa and more preferentially ranging from 0.005 MPa to 0.2 MPa.

The polymerization is preferentially performed at a temperature ranging from 50° C. to 250° C.

The solid-state polymerization process may be performed according to the conventional processes known to those skilled in the art. The fundamental principle of these processes consists in bringing the dry solid salt obtained from step (b) in the presence of the compound(s) (C), under air or under an inert atmosphere or under vacuum, to a temperature which is below the melting point of the salt but sufficient to allow the polymerization reaction, generally a temperature above the glass transition temperature of the polyimide. Such a process may thus comprise, in brief:

a) heating of the product by conductive or convective diffusion or by radiation;
b) inertizing by application of a vacuum, flushing with a neutral gas such as nitrogen, $CO_2$, or superheated steam, or application of a positive pressure;
c) removal of the condensation by-product by evaporation, followed by flushing with the carrier gas or concentration of the gas phase;
d) mechanical stirring or fluidization of the solid phase with the carrier gas or vibration may be desirable in order to improve the heat and mass transfers and also to prevent any risk of agglomeration of the divided solid.

Preferentially, a means for keeping the polyimide in motion is used in the course of step (d) so as to obtain said polyimide in the form of particles, and to prevent aggregation of these particles. Mechanical stirring, such as by use of a stirrer, by rotation of the reactor, or by vibratory agitation, or fluidization with a carrier gas, may be used to do this.

The polyimides obtained via the process according to the invention are advantageously in the form of particles whose median diameter D50 ranges from 0.01 to 2 mm.

The term "median diameter D50" means the median which separates the curve of particle size distribution by volume into two parts of equal areas. The particle size analyses may be performed using a Mastersizer X laser diffraction particle size analyzer having an extensive optical bench from Malvern Instruments S.A., making it possible to characterize particle sizes of between 2 and 2000 μm. As the distribution is by volume, the median diameter will correspond to 50% of the total volume of the particles. Furthermore, the given median diameter corresponds to the diameter of an equivalent sphere, it being assumed that all the objects have a shape equivalent to a sphere.

Preferably, the polyimides obtained via the process according to the invention are white. They especially have a CIE b* colorimetric characteristic of less than or equal to 10.

Preferably, the number-average molar mass $M_n$ of the polyimides according to the invention ranges from 500 to 50 000 g/mol, more preferentially from 2000 to 40 000 g/mol and even more preferentially from 5000 to 30 000 g/mol.

The specific molar masses in the present invention may be determined via many methods that are well known to those skilled in the art.

By way of illustration of these methods, mention may especially be made of that which is based on an analysis of the end groups, for example determination by NMR or titration, or that which calls upon a measurement using gel permeation chromatography (GPC), also known as size exclusion chromatography (SEC). In general, the choice of the solvent for performing the GPC measurements of a polyimide is made in a manner that is well known per se as a function of the structure of the polyimide.

Preferentially, to determine the concentrations of end groups, the NMR measurements of a polyimide may be taken in concentrated deuterated sulfuric acid as solvent.

The calculation of the mass distribution and also the average mass Mn may be performed in polystyrene equivalents (PST) or as absolute mass, after calibration using commercial standards. If necessary, absolute mass measurements may be performed by viscometric detection. In the context of the present invention, the average molar mass Mn is expressed as absolute mass. The average molar mass Mn may be calculated from the entire distribution or after truncation of the low masses if it is not desired to take into account the contribution of the cyclic oligomers.

At the end of step (d), the polyimide synthesized via the process according to the invention is recovered, preferably in the form of particles, and this may especially be done without additional mechanical milling being necessary. On the other hand, it may be useful to perform deaggregation of particles which may be agglomerated.

The polyimide obtained via the process according to the invention may be used to prepare compositions that are generally obtained by mixing the polyimide with various compounds, especially fillers and/or additives. The process is performed at more or less high temperature and at more or less high shear force, according to the nature of the various compounds. The compounds can be introduced simultaneously or successively. Use is generally made of an extrusion device in which the material is heated, then melted and subjected to a shear force, and conveyed. According to particular embodiments, it is possible to prepare preblends, optionally in the melt state, before preparation of the final composition. It is possible, for example, to prepare a preblend in a resin, of the polyimide, for example, so as to produce a masterbatch.

A composition may be obtained by melt or nonmelt mixing of polyimides obtained via the manufacturing process as described previously, with reinforcing or bulking fillers and/or with impact modifiers and/or with additives.

Said composition may optionally comprise one or more other polymers.

Said composition may comprise between 20% and 90% by weight, preferentially between 20% and 70% by weight and more preferentially between 35% and 65% by weight of polyimide, according to the invention, relative to the total weight of the composition.

Said composition may also comprise reinforcing or bulking fillers. Reinforcing or bulking fillers are fillers conventionally used for the production of thermoplastic compositions, in particular based on polyamide. Mention may in particular be made of reinforcing fibrous fillers, such as glass fibers, carbon fibers or organic fibers, non-fibrous fillers such as particulate or lamellar fillers and/or exfoliable or non-exfoliable nanofillers, for instance alumina, carbon black, clays, zirconium phosphate, kaolin, calcium carbonate, copper, diatomaceous earths, graphite, mica, silica, titanium dioxide, zeolites, talc, wollastonite, polymeric fillers, for instance dimethacrylate particles, glass beads or glass powder. It is especially preferred to use reinforcing fibers, such as glass fibers.

Said composition may comprise between 5% and 60% by weight of reinforcing or bulking fillers and preferentially between 10% and 40% by weight, relative to the total weight of the composition.

Said composition, comprising the polyimide obtained via the process according to the invention as defined previously, may comprise at least one impact modifier, i.e. a compound that is capable of modifying the impact strength of a polyimide composition. These impact modifier compounds preferentially comprise functional groups that are reactive with the polyimide. The expression "functional groups that are reactive with the polyimide" means groups that are capable of reacting or of interacting chemically with the anhydride, acid or amine residual functions of the polyimide, in particular by covalency, ionic or hydrogen bond interaction or van der Waals bonding. Such reactive groups ensure effective dispersing of the impact modifiers in the polyimide matrix. Examples that may be mentioned include anhydride, epoxide, ester, amine and carboxylic acid functions and carboxylate or sulfonate derivatives.

Said composition may also comprise additives generally used for the manufacture of polyimide or polyamide compositions. Thus, mention may be made of lubricants, flame retardants, plasticizers, nucleating agents, anti-UV agents, catalysts, antioxidants, antistatic agents, dyes, matting agents, molding aids or other conventional additives.

The fillers, impact modifiers and/or additives may be added to the polyimide by suitable, usual means that are well known in the field of engineering plastics, for instance during salification, after salification, during solid-state polymerization, or as a melt mixture.

The polyimide compositions are generally obtained by blending the various compounds included in the composition without heating or in the melt. The process is performed at more or less high temperature and at more or less high shear force, according to the nature of the various compounds. The compounds can be introduced simultaneously or successively. Use is generally made of an extrusion device in which the material is heated, then melted and subjected to a shear force, and conveyed.

It is possible to blend all the compounds in the melt phase during a single operation, for example during an extrusion operation. It is possible, for example, to blend granules or powders of the polymer materials, to introduce them into the extrusion device in order to melt them and to subject them to more or less high shearing. According to specific embodiments, it is possible to preblend some of the compounds, in the melt or not in the melt, before preparation of the final composition.

The polyimide or the various compositions as defined previously may be used for any forming process for the manufacture of plastic articles.

Such plastic articles comprising the polyimide as manufactured by the process according to the invention may be manufactured. To this end, mention may be made of various techniques such as the molding process, especially injection molding, extrusion, extrusion blow-molding, or alternatively rotary molding, especially in the field of motor vehicles or of electronics and electricity, for example. The extrusion process may especially be a spinning process or a process for manufacturing films.

By virtue of its particularly good fluidity, the polyimide obtained via the process according to the invention is most particularly suitable for forming operations involving injection molding or melt extrusion.

Articles such as continuous-fiber composite articles or impregnated fabrics may be manufactured. These articles may especially be manufactured by contacting a fabric and polyimide particles obtained via the process according to the invention in the solid or melt state. Fabrics are textile surfaces obtained by assembling yarns or fibers which are rendered integral by any process, in particular such as adhesive bonding, felting, braiding, weaving or knitting. These fabrics are also referred to as fibrous or filamentous networks, for example based on glass fiber, carbon fiber or the like. Their structure may be random, unidirectional (1D) or multidirectional (2D, 2.5D, 3D or other).

The polyimides obtained via the process according to the invention may also be used in the form of particles in processes for manufacturing articles by selective melting of polymer powder layers, especially rapid prototyping by solid-phase laser sintering. Manufacture by selective melting of layers is a process for manufacturing articles that comprises laying down layers of materials in powder form, selectively melting a portion or a region of a layer, and laying down a new layer of powder, and again melting a portion of this layer, and so on, so as to give the desired object. The selectivity of the portion of the layer to be melted is obtained by means, for example, of the use of absorbers, inhibitors, or masks, or via the input of focused energy, for instance electromagnetic radiation such as a laser beam. Preference is especially given to sintering by addition of layers, particularly to rapid prototyping by laser sintering.

Specific language is used in the description so as to facilitate understanding of the principle of the invention. Nevertheless, it should be understood that no limitation of the scope of the invention is envisaged by the use of this specific language. Modifications, improvements and refinements may in particular be envisaged by a person conversant with the technical field concerned on the basis of his own general knowledge.

The term "and/or" includes the meanings and, or, and all the other possible combinations of the elements connected to this term.

Other details or advantages of the invention will become more clearly apparent in the light of the examples given below purely by way of indication.

EXAMPLES

Measuring Standards

The melting points (Tf) and the crystallization on cooling points (Tc) of the polyimides are determined by differential scanning calorimetry (DSC), using a TA-Instruments Q20 machine, at a rate of 10° C./min. The Tf and Tc values for the polyimides are determined at the top of the melting and crystallization peaks. The glass transition temperature (Tg) is determined on the same machine at a rate of 40° C./min (when possible, it is determined at 10° C./min and specified in the examples).

For the determination of the melting point of the salt, the end temperature of the endotherm measured by heating the salt at 10° C./min is considered.

The reduced solution viscosity ($\eta$red) of the polyimides is measured by capillary viscometry using an Ubbelohde viscometer 0.4 mm in diameter in a bath thermostatically maintained at 25° C. The solution of polymer for the analysis is at 5 g/L with a phenol-ortho-dichlorobenzene mixture (50/50 by mass) as solvent. The flow time is measured three times per sample.

The stoichiometry (S) of the dry salt is determined by pH-metric titration using a Mettler-Toledo T50 machine. The titration is performed on a volume of 40 mL of water containing about 0.5 g of dry salt to which are added 10 mL of sodium hydroxide at a concentration of 1 mol/L. The titrating solution used is a hydrochloric acid solution at 1 mol/L. Titration of the sodium hydroxide residue characterized by the first equivalent volume (V1) affords access to the amount of pyromellitic acid (PMA) by back-titration. The differences of the equivalent volumes (V2–V1) makes it possible to measure the amount of Jeffamine® 150 (J150) by direct titration. The titration is performed on three samples. The stoichiometry S of the salt is thus defined by the mole ratio between the number of moles of tetra-acid and the number of moles of diamine. After addition of the acid chain limiter, a new stoichiometric ratio, S', is defined such that S' is equal to the mole ratio between the sum of the numbers of moles of tetra-acid and of acid chain limiter, and the number of moles of diamine. The accuracy of the measurement on the stoichiometric ratios is ±0.006. When no chain limiter is added, S=S'.

Example 1: Preparation of a Salt J150PMA Synthesized in Pure Ethanol (a) Preparation of the Salt A 1 L reactor is charged with 85.59 g (0.33 mol) of 96% pyromellitic acid (PMA) (Sigma-Aldrich) and 800 mL of pure ethanol. The reaction medium is stirred at room temperature while flushing gently with nitrogen. 50.82 g (0.34 mol) of 97% Jeffamine® 150 (J150) (Huntsman) are dissolved in 200 mL of pure ethanol at room temperature. This solution is then placed in a dropping funnel connected to the 1 L reactor and is added dropwise over 90 minutes to the ethanolic solution of pyromellitic acid. Contact between the diamine and the pyromellitic acid brings about the formation of a salt, which precipitates immediately under vigorous stirring. The reaction medium is maintained under vigorous stirring for 2 hours at room temperature and under nitrogen.

(b) Drying of the Salt Obtained

The salt powder is recovered by vacuum filtration on a sinter and then disintegrated and dried under vacuum at 80° C. overnight. The mass yield is 97.8%. The powder is fine and white. The stoichiometric ratio S of the salt thus obtained is measured via the pH-metric method described above, at 1.012.

Example 1A (Comparative): Preparation of a Polyimide PI J150PMA without Addition of Chain Limiter (c) Milling of the Dry Solid Salt Obtained on Conclusion of Step (b) of Example 1

A mass of 8.9 g of dry salt J150PMA obtained on conclusion of step (b) of example 1 is milled finely in a mortar without addition of chain limiter.

(d) Solid-State Polymerization of the Dry Solid Salt in the Absence of the Chain Limiter A mass of 8.9 g of the salt obtained on conclusion of step (c) is placed in a glass tube reactor with mechanical stirring and inertizing with nitrogen. The pressure is equal to atmospheric pressure. The device is heated at 220° C. with stirring for 3 hours. The PI powder J150PMA obtained is white, and perfectly dry. The melting point measured by DSC is 301° C., its crystallization point is measured at 273° C., its glass transition temperature, determined at 10° C./min, is evaluated at 113° C. and its reduced viscosity is 101.9 mL/g.

Example 1B (Invention): Preparation of a Polyimide PI J150PMA with Addition of Chain Limiter (Pyromellitic Acid, PMA) Such that S'=1.050

(c) Addition of a Chain Limiter to the Dry Solid Salt Obtained on Conclusion of Step (b) of Example 1

A mass of 0.25 g of pyromellitic acid (PMA) is added to 10.001 g of dry salt J150PMA obtained on conclusion of step (b) of example 1. The mixture of the two powders is finely milled in a mortar. The theoretical stoichiometry S' of the salt thus prepared is equal to 1.050.

(d) Solid-State Polymerization of the Dry Solid Salt Obtained on Conclusion of Step (c)

The salt obtained on conclusion of step (c) is placed in a glass tube reactor with mechanical stirring and inertizing with nitrogen. The pressure is equal to atmospheric pressure. The device is heated at 220° C. with stirring for 3 hours. The PI powder J150PMA obtained is white, and perfectly dry. The melting point measured by DSC is 299° C., its crystallization point is measured at 270° C., its glass transition temperature, determined at 10° C./min, is evaluated at 110° C. and its reduced viscosity is 49.1 mL/g.

Example 1C (Invention): Preparation of a Polyimide PI J150PMA with Addition of Chain Limiter (Phthalic Acid, PHTA) Such that S'=1.049

(c) Addition of a Chain Limiter to the Dry Solid Salt Obtained on Conclusion of Step (b) of Example 1

A mass of 0.154 g of 99% phthalic acid (PHTA) (Aldrich) is added to 10.005 g of dry salt J150PMA obtained on conclusion of step (b) of example 1. The mixture of the two powders is finely milled in a mortar. The theoretical stoichiometry S' of the salt thus prepared is equal to 1.049.

(d) Solid-State Polymerization of the Dry Solid Salt Obtained on Conclusion of Step (c)

The salt obtained on conclusion of step (c) is placed in a glass tube reactor with mechanical stirring and inertizing with nitrogen. The pressure is equal to atmospheric pressure. The device is heated at 220° C. with stirring for 3 hours. The PI powder J150PMA obtained is white, and perfectly dry. The melting point measured by DSC is 298° C., its crystallization point is measured at 262° C., its glass transition temperature, determined at 10° C./min, is evaluated at 96° C. and its reduced viscosity is 48.0 mL/g.

Example 2 (Comparative): Preparation of a Polyimide PI J150PMA by Solid-State Polymerization of a Salt Such that S=1.038, without Addition of Chain Limiter (a) Preparation of the Salt A 1 L reactor is charged with 27.04 g (0.107 mol) of 96% pyromellitic acid (PMA) (Sigma-Aldrich) and 800 mL of pure ethanol. The reaction medium is stirred at room temperature while flushing gently with nitrogen. 15.43 g (0.104 mol) of 97% Jeffamine® 150 (J150) (Huntsman) are dissolved in 200 mL of pure ethanol at room temperature. This solution is then placed in a dropping funnel connected to the 1 L reactor and is added dropwise over 90 minutes to the ethanolic solution of pyromellitic acid. Contact between the diamine and the pyromellitic acid brings about the formation of a salt, which precipitates immediately under vigorous stirring. The reaction medium is maintained under vigorous stirring for 2 hours at room temperature and under nitrogen.

(b) Drying of the Salt Obtained

The salt powder is recovered by evaporating off the solvent using a rotary evaporator at 79° C. while flushing with nitrogen at atmospheric pressure. The mass of dry salt recovered is 40.6 g, i.e., a mass yield of 97.2%. The powder is fine and white. The stoichiometric ratio S of the salt thus obtained is measured via the pH-metric method described above, at 1.038.

(c) Milling of the Dry Solid Salt

A mass of 10 g of dry salt J150PMA obtained on conclusion of step (b) is milled finely in a mortar without addition of chain limiter.

(d) Solid-State Polymerization of the Dry Solid Salt Obtained on Conclusion of Step (c)

The salt obtained on conclusion of step (c) is placed in a glass tube reactor with mechanical stirring and inertizing with nitrogen. The pressure is equal to atmospheric pressure. The device is heated at 220° C. with stirring for 3 hours. The PI powder J150PMA obtained is white, and perfectly dry. The melting point measured by DSC is 300° C., its crystallization point is measured at 262° C., its glass transition temperature, determined at 10° C./min, is evaluated at 111° C. and its reduced viscosity is 60.1 mL/g.

Example 3 (Comparative): Preparation of a Polyimide PI J150PMA with Addition of Chain Limiter (Octylamine, MA8) Such that S'=0.916

(a) Preparation of the Salt

A 1 L reactor is charged with 65.02 g (0.256 mol) of 96% pyromellitic acid (PMA) (Sigma-Aldrich) and 800 mL of pure ethanol. The reaction medium is stirred at room temperature while flushing gently with nitrogen. 38.45 g (0.252 mol) of 97% Jeffamine® 150 (J150) (Huntsman) are dissolved in 200 mL of pure ethanol at room temperature. This solution is then placed in a dropping funnel connected to the 1 L reactor and is added dropwise over 90 minutes to the ethanolic solution of pyromellitic acid. Contact between the diamine and the pyromellitic acid brings about the formation of a salt, which precipitates immediately under vigorous stirring. The reaction medium is maintained under vigorous stirring for 2 hours at room temperature and under nitrogen.

(b) Washing and Drying of the Salt Obtained

The salt powder is recovered by vacuum filtration on a sinter and then washed with refluxing ethanol (1.2 L) with stirring for 3 hours. The washed salt powder is filtered again by vacuum on a sinter and then disintegrated and dried under vacuum at 80° C. overnight. The mass yield is 97%. The powder is fine and white. The stoichiometric ratio S of the salt thus obtained is measured via the pH-metric method described above, at 1.008.

(c) Addition of the Chain Limiter to the Dry Solid Salt Obtained on Conclusion of Step (b)

A mass of 0.413 g of 99% octylamine (MA8) (Aldrich) is added to 12 g of dry salt J150PMA obtained on conclusion of step (b). The mixture of the salt powder and of octylamine is finely milled in a mortar. The stoichiometry S' of the salt thus prepared is equal to 0.916.

(d) Solid-State Polymerization of the Dry Solid Salt Obtained on Conclusion of Step (c)

The salt obtained on conclusion of step (c) is placed in a glass tube reactor with mechanical stirring and inertizing with nitrogen. The pressure is equal to atmospheric pressure. The device is heated at 220° C. with stirring for 3 hours. The PI powder J150PMA obtained is white, and perfectly dry. The melting point measured by DSC is 300° C., its crystallization point is measured at 268° C., its glass transition temperature, determined at 10° C./min, is evaluated at 108° C. and its reduced viscosity is 170.8 mL/g.

All the results obtained in the above examples are collated in table 1 below:

TABLE 1

| Example | Chain limiter introduced into step (c) | S' | Reduced viscosity (mL/g) | Tf (° C.) | Tc (° C.) | Tg (° C.) |
|---|---|---|---|---|---|---|
| 1A | — | 1.012 | 101.9 | 301 | 273 | 113 |
| 1B | PMA | 1.050 | 49.1 | 299 | 270 | 110 |
| 1C | PHTA | 1.049 | 48 | 298 | 262 | 96 |
| 2 | — | 1.038 | 60.1 | 300 | 262 | 111 |
| 3 | MA8 | 0.916 | 170.8 | 300 | 268 | 108 |

Example 3 shows that the process used for the manufacture of polyimides, using octylamine (a monoamine) as chain limiter, is unsatisfactory. Specifically, the polyimide obtained has a reduced viscosity of 170.8 mL/g, which is well above the value of 101.9 mL/g obtained for the polyimide manufactured according to a process disclosed in comparative example 1A. This example 3 proves the fact that octylamine did not act as chain limiter as expected.

Examples 1B and 1C firstly demonstrate the efficiency of the process according to the invention since a polyimide with a satisfactory viscosity was obtained in each case.

They also demonstrate the fact that both pyromellitic acid (example 1B) and phthalic acid (example 1C) introduced, respectively, during step (c) of the process of the invention, afforded particularly satisfactory control of the chain length of the polyimide obtained. Specifically, the polyimides obtained have, respectively, a reduced viscosity of 49.1 mL/g (example 1B) and of 48 mL/g (example 1C). These values are very much lower than the value of 101.9 mL/g obtained for the polyimide manufactured in the context of example 1A, and lower than the value of 60.1 mL/g obtained in the context of example 2.

The invention claimed is:

1. A process for manufacturing aromatic polyimides, characterized in that it comprises the following steps:
    (a) preparing one or more solid salts by reacting, one or more aromatic tetracarboxylic acids and one or more diamines in a mole ratio ranging from 0.95 to 1.05;
    (b) drying the solid salt(s);
    (c) preparing a polymerization reaction by dry mixing the dry salt derived from step (b) with one or more compounds (C) in a dry state, selected from pyromellitic acid (PMA) and phthalic acid (PHTA), and mixtures thereof; and
    (d) solid-state polymerization of said solid salt(s) in the presence of the one or more compound(s) (C).

2. The process as claimed in claim 1, characterized in that the solid salt(s) are prepared by reacting one or more aromatic tetracarboxylic acids and one or more diamines in a mole ratio ranging from 0.99 to 1.01.

3. The process as claimed in claim 1, characterized in that the solid salt(s) are prepared by reacting in stoichiometric amount one or more aromatic tetracarboxylic acids and one or more diamines.

4. The process as claimed in claim 1, characterized in that said aromatic tetracarboxylic acids or dianhydrides used in step (a) are chosen from pyromellitic acid, 3,3',4,4'-biphenyltetracarboxylic acid, 2,3,3',4'-biphenyltetracarboxylic acid, 2,2',3,3'-biphenyltetracarboxylic acid, 3,3',4,4'-benzophenonetetracarboxylic acid, 2,2',3,3'-benzophenonetetracarboxylic acid, 1,2,5,6-naphthalenetetracarboxylic acid, 2,3,6,7-naphthalenetetracarboxylic acid, 2,3,5,6-pyridinetetracarboxylic acid, 3,4,9,10-perylenetetracarboxylic acid, 3,3',4,4'-tetraphenylsilanetetracarboxylic acid, and 2,2'-bis(3,4-bicarboxyphenyl) hexafluoropropanetetracarboxylic acid.

5. The process as claimed in claim 1, characterized in that the diamines are molecules of formula $H_2N$—R—$NH_2$ with a linear or branched, saturated or unsaturated aliphatic, cycloaliphatic or aromatic divalent hydrocarbon-based radical R, optionally comprising one or more heteroatoms.

6. The process as claimed in claim 5, characterized in that the radical R comprises from 2 to 50 carbon atoms, and optionally one or more heteroatoms.

7. The process as claimed in claim 1, characterized in that the diamines are aliphatic diamines selected from 1,2-diaminoethane, 1,3-diaminopropane, 1,4-diaminobutane, 1,5-diaminopentane, 2-methyl-1,5-diaminopentane, hexamethylenediamine, 3-methylhexamethylenediamine, 2,5-dimethylhexamethylenediamine, 2,2,4- and 2,4,4-trimethylhexamethylenediamine, 1,7-diaminoheptane, 1,8-diaminooctane, 2,2,7,7-tetramethyloctamethylenediamine, 1,9-diaminononane, 5-methyl-1,9-diaminononane, 1,10-diaminodecane, 1,11-diaminoundecane, 1,12-diaminododecane, 1,13-diaminotridecane, and 1,14-diaminotetradecane.

8. The process as claimed in claim 1, characterized in that the diamine(s) are chosen from cycloaliphatic diamines, and preferably from isophorone diamine, 1,3-diaminocyclohexane, 1,4-diaminocyclohexane, diaminodicyclohexylmethane, 1,3-bis(aminomethyl)cyclohexane, 4,4'-methylenebis(cyclohexylamine) and 4,4'-methylenebis(2-methylcyclohexylamine).

9. The process as claimed in claim 1, characterized in that the diamine(s) are aromatic diamines selected from m-phenylenediamine, p-phenylenediamine, 3,4'-diaminodiphenyl ether, 4,4'-diaminodiphenyl ether, m-xylylenediamine and p-xylylenediamine.

10. The process as claimed in claim 1, characterized in that the amount of compound (C) introduced into step (c) is greater than 0.5% as number of moles relative to the total number of moles of aromatic tetracarboxylic acid and of diamine used in step (a).

11. The process as claimed in claim 1, characterized in that, during step (d), the polymerization is performed at a temperature T which obeys the following relationship: Tf of the salt from step (a)>T>Tg of the polyimide to be obtained.

12. The process as claimed in claim 1, characterized in that, during step (d), the polymerization is performed at an absolute pressure ranging from 0.005 to 1 MPa.

13. The process as claimed in claim 1, characterized in that, during step (d), the polymerization is performed at a temperature ranging from 50° C. to 250° C.

14. The process as claimed in claim 1, characterized in that the number-average molar mass $M_n$ of the polyimide(s) obtained in step (d) ranges from 500 to 50 000 g/mol.

15. The process as claimed in claim 11, wherein the manufactured aromatic polyimide has a Tg of less than 150° C.

* * * * *